(12) United States Patent
Takahashi et al.

(10) Patent No.: US 10,900,535 B2
(45) Date of Patent: Jan. 26, 2021

(54) MANIPULATION DEVICE

(71) Applicant: Alps Alpine Co., Ltd., Tokyo (JP)

(72) Inventors: Kazunari Takahashi, Miyagi-ken (JP); Atsushi Goto, Miyagi-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 150 days.

(21) Appl. No.: 16/036,715

(22) Filed: Jul. 16, 2018

(65) Prior Publication Data

US 2018/0320750 A1 Nov. 8, 2018

Related U.S. Application Data

(63) Continuation of application No. PCT/JP2017/004984, filed on Feb. 10, 2017.

(30) Foreign Application Priority Data

Feb. 18, 2016 (JP) .................................. 2016-029089

(51) Int. Cl.
*F16F 9/12* (2006.01)
*F16F 9/53* (2006.01)
(Continued)

(52) U.S. Cl.
CPC ................ *F16F 9/12* (2013.01); *F16F 9/535* (2013.01); *G05G 5/03* (2013.01);
(Continued)

(58) Field of Classification Search
CPC ...... F16F 9/12; F16F 9/535; F16F 5/03; F16F 2224/045; F16D 57/002; F16D 35/028
See application file for complete search history.

(56) References Cited

U.S. PATENT DOCUMENTS 3,305,055 A * 2/1967 Slaughter ................ F16D 37/02
192/21.5
5,598,908 A * 2/1997 York ....................... F16D 37/02
188/267
(Continued)

FOREIGN PATENT DOCUMENTS

JP 2003-050639 2/2003
JP 2005-507061 3/2005
(Continued)

OTHER PUBLICATIONS

International Search Report for International Application No. PCT/JP2017/004984.

*Primary Examiner* — Bradley T King
*Assistant Examiner* — James K Hsiao
(74) *Attorney, Agent, or Firm* — Beyer Law Group LLP

(57) ABSTRACT

A manipulation device has a manipulation body rotationally operated by the manipulator, a support body rotatably supporting the manipulation body, and a rotational load imparting mechanism. The rotational load imparting mechanism has a movable member engaged with the rotational axis of the manipulation body, a magnetism generating mechanism facing the movable member with a gap intervening, and a magnetic viscous fluid, its viscosity changing according to the strength of a magnetic field. The magnetism generating mechanism has a coil generating a magnetic field and a first yoke provided so as to enclose the coil. The first yoke has a first opposing part and second opposing part, which are separated by slits, on a side facing the movable member. The magnetic viscous fluid is filled in the gap, which is between the first opposing part and the movable member and between the second opposing part and the movable member.

13 Claims, 11 Drawing Sheets

(51) Int. Cl.
*G05G 5/03* (2008.04)
*G05G 1/08* (2006.01)
*G05G 5/08* (2006.01)

(52) U.S. Cl.
CPC .......... *F16F 2224/045* (2013.01); *G05G 1/08* (2013.01); *G05G 5/08* (2013.01)

(56) References Cited

U.S. PATENT DOCUMENTS

| | | | | |
|---|---|---|---|---|
| 5,816,372 | A * | 10/1998 | Carlson | A63B 21/0056 188/267.2 |
| 5,842,547 | A * | 12/1998 | Carlson | F16D 55/00 188/267 |
| 5,896,965 | A * | 4/1999 | Gopalswamy | F16D 37/02 192/21.5 |
| 6,186,290 | B1 * | 2/2001 | Carlson | F16D 57/002 188/161 |
| 8,146,223 | B2 * | 4/2012 | Ebert | B23P 6/00 29/255 |
| 2003/0030407 | A1 | 2/2003 | Maeda | |
| 2007/0144842 | A1 * | 6/2007 | Zhou | F16F 9/535 188/267 |
| 2011/0128135 | A1 | 6/2011 | Periquet et al. | |
| 2012/0211315 | A1 * | 8/2012 | Shiao | F16F 9/535 188/267.2 |
| 2014/0152066 | A1 * | 6/2014 | Hiemenz | F16F 9/535 297/344.1 |
| 2015/0345134 | A1 * | 12/2015 | Takahashi | F16F 9/535 52/167.2 |

FOREIGN PATENT DOCUMENTS

| | | |
|---|---|---|
| JP | 2011-519099 | 6/2011 |
| JP | 2014-181778 | 2/2014 |
| JP | 2014-181778 | 9/2014 |
| WO | 2003/036120 | 5/2003 |

* cited by examiner

MANIPULATION DEVICE

CLAIM OF PRIORITY

This application is a Continuation of International Application No. PCT/JP2017/004984 filed on Feb. 10, 2017, which claims benefit of Japanese Patent Application No. 2016-029089 filed on Feb. 18, 2016. The entire contents of each application noted above are hereby incorporated by reference.

BACKGROUND OF THE INVENTION

Field of the Invention

The present invention relates to a manipulation device that can give a manipulation feeling to a manipulator in response to a manipulation by the manipulator.

Description of the Related Art

Recently, various manipulation devices with a force feedback function are proposed. When the manipulator manipulates a manipulation member, these various manipulation devices impart an external force (sense of force) such as a resistance force or thrust that matches the amount of manipulation of the manipulation member and its manipulation direction so that a manipulation feeling can be made superior and a desired manipulation can be reliably performed. In particular, in the manipulation of a vehicle-mounted control device such as for air conditioning, audio, or navigation, blind manipulation is often performed, rather than manipulation performed while the control device is viewed, so imparting a sense of force to the manipulation member (manipulation knob) has been effective from the viewpoint of safety as well.

A manual input device 800, for use in an automobile, that uses the manipulation device as described above, is proposed in Japanese Unexamined Patent Application Publication No. 2003-50639 (cited as a first conventional example). FIG. 10 is a longitudinal cross-sectional view of the manual input device 800 in the first conventional example, illustrating the main elements in the basic structure of the manual input device 800.

The manual input device 800 illustrated in FIG. 10 includes a knob 880 (manipulation member) that is rotated by being manually manipulated by the operator (manipulator), a planetary gear mechanism having a carrier axis 851 provided integrally with the knob 880, a cylindrical ring gear case 860 (fixing member) that constantly fixes a ring gear 862 in the planetary gear mechanism, a motor 810 having an output axis 811 engaged with a sun gear 832 in the planetary gear mechanism, an encoder 830 (detection means) that detects the rotation of the output axis 811 of the motor 810, and a control means that controls the rotation of the motor 810 according to the result of detection by the encoder 830. To give a predetermined manipulation feeling to the manipulator, the manual input device 800 rotates the motor 810 at a predetermined timing, and transmits this rotational force to the knob 880 through the planetary gear mechanism.

Although this manual input device 800 can give a superior manipulation feeling, however, the use of the motor 810 has made it difficult for the manual input device 800 to meet a demand for further downsizing. In view of this, a method has been explored by which an external force (sense of force), such as a resistance force or thrust that matches the amount of manipulation of the manipulation member and its manipulation direction, has been exploded without using the motor 810.

In Japanese Unexamined Patent Application Publication (Translation of PCT Application) No. 2005-507061 (cited as a second conventional example), a manual brake 911 is proposed that uses a magnetic field responsive material (magnetic viscous fluid) the fluidity of which is affected by a magnetic field generating means. FIG. 11 is a cross-sectional view of the manual brake 911 in the second conventional example in the longitudinal direction.

The manual brake 911 illustrated in FIG. 11 includes a housing 913 having a first housing chamber 915 and a second housing chamber 917, a closing plate 919 that covers the open end of the housing 913, a shaft 923 that passes through the second housing chamber 917 and extends to the first housing chamber 915, a rotor 921 that is provided integrally with the shaft 923 at its end and is disposed in the first housing chamber 915 in parallel with the closing plate 919, a magnetic field generator 929 that is provided in the first housing chamber 915 in the immediate vicinity of the outer periphery of the rotor 921, a magnetic responsive material 941 that is filled in the first housing chamber 915 so as to enclose the rotor 921, and a control means 925 that is provided in the second housing chamber 917 and controls and monitors a brake operation. The magnetic field generator 929 has a coil 931 and a pole piece 933 disposed so as to enclose three sides of the coil 931.

When the coil 931 is energized, a magnetic flux J37 illustrated in FIG. 11 by broken lines is generated. Along with the generation of this magnetic flux J37, soft magnetic or magnetizable particles in the magnetic responsive material 941 are arranged along the magnetic flux J37. Thus, resistance to be given to the rotor 921 by the magnetic responsive material 941 is increased in a direction in which this arrangement is cut, that is, the rotational direction of the rotor 921, which rotationally operates. Accordingly, this manual brake 911 has a brake effect that stops the rotational operation of the shaft 923 by using the magnetic responsive material 941 and rotor 921.

SUMMARY OF THE INVENTION

By using the effect of the magnetic responsive material 941 (magnetic viscous fluid) described above, a method of imparting an external force (sense of force), such as a resistance force or thrust that matches the amount of manipulation of the manipulation member and its manipulation direction, without using a motor can be considered. In an application to a device such as the manual brake 911, the diameter of the rotor 921 is often large, so an adequate eternal force can be imparted to the rotor 921 (movable member). As for a manipulation device manipulated by a manipulator, however, there has been the problem that the movable member is small, so an adequate eternal force cannot be imparted to the movable member. In addition, there have been increasing demands for precisely controlling an external force to be imparted to the movable member and giving a superior manipulation feeling to the manipulator have been enhanced.

The present invention addresses the problem described above by providing a manipulation device that uses a magnetic viscous fluid so that a superior manipulation feeling is obtained.

To solve this problem, the manipulation device in the present invention is a rotation-type manipulation device that has a manipulation member with a manipulation body that rotationally operates according to a manipulation by a manipulator, a support body that rotatably supports the manipulation body, and a rotational load imparting mechanism that imparts a rotational load to the manipulation body. The manipulation body has a rotational axis that enables the rotational operation. The rotational load imparting mechanism has a movable member that performs the rotational operation by being engaged with the rotational axis, a magnetism generating mechanism that faces the movable member with a gap intervening therebetween, and a magnetic viscous fluid present in at least part of the gap, the viscosity of the magnetic viscous fluid changing according to the strength of a magnetic field. The magnetism generating mechanism has a coil that generates a magnetic field by being energized, and also has a first yoke provided on one side of the movable member so as to enclose the coil. The first yoke has a first opposing part and a second opposing part, which are separated by a slit, on a side facing the movable member. The magnetic viscous fluid is filled in the gap, which is between the first opposing part and the movable member and between the second opposing part and the movable member.

According to this, in the manipulation device in the present invention, a magnetic field is generated due to energization to the coil, a magnetic path is formed so as to spread toward the movable member from the first opposing part of the first yoke to its second opposing part, and thereby magnetic particles in the magnetic viscous fluid are aligned along a magnetic flux. Therefore, a rotational load is applied by the magnetic viscous fluid to the movable member, which rotationally operates in a direction crossing a magnetic flux formed from first opposing part to the movable member and from the movable member to the second opposing part. Due to this, a rotational load is applied to the manipulation body through the movable member and rotational axis. Accordingly, it is possible to provide the manipulation device from which a superior manipulation feeling is obtained.

In the manipulation device in the present invention, preferably, there is a match between the area of a first opposing plane of the first opposing part, the first opposing plane facing the magnetic viscous fluid, and the area of a second opposing plane of the second opposing part, the second opposing plane facing the magnetic viscous fluid.

According to this, magnetic flux densities become equivalent at the inlet and outlet of the magnetic flux. This causes a magnetic field to efficiently act in control of viscosity. Due to this, it is possible to evenly impart a rotational load to the movable member and thereby give a more superior manipulation feeling to the manipulator.

In the manipulation device in the present invention, the movable member is preferably formed from a soft magnetic material.

According to this, a magnetic path is reliably formed from the first opposing part of the first yoke to the movable member and from the movable member to the second opposing part of the first yoke, and thereby magnetic particles in the magnetic viscous fluid are aligned in an opposing plane direction in which the first yoke and movable member face each other. Thus, a stronger rotational load is applied to the movable member, which rotationally operates in a direction crossing the opposing plane direction in which the magnetic particles are aligned. Due to this, a stronger rotational load is applied to the manipulation body through the movable member and rotational axis and a more superior manipulation feeling can be given to the manipulator.

In the manipulation device in the present invention, the magnetism generating mechanism preferably has a second yoke disposed on another side of the movable member so as to face the movable member.

According to this, a magnetic path is reliably formed from the first opposing part of the first yoke to the second yoke and from the second yoke to the second opposing part of the first yoke. Thus, magnetic particles can be aligned in a direction perpendicular to the direction in which the movable member rotationally operates, so a stronger rotational load can be applied. Due to this, a stronger rotational load can be applied to the manipulation body through the movable member and rotational axis.

In the manipulation device in the present invention, the magnetic viscous fluid is preferably filled in a gap between the movable member and the second yoke. According to this, a further rotational load can be imparted to the movable member, which rotationally operates in a direction crossing the magnetic flux. Due to this, even in an equivalent magnetic field, a further large manipulation feeling can be given to the manipulator.

In the manipulation device in the present invention, the movable member is preferably formed from a soft magnetic material and, in the movable member, movable part slits are formed at positions at which the movable part slits face the slit formed in the first yoke.

According to this, the magnetic flux generated from the coil is not confined by the movable member; the magnetic flux can reliably penetrate to the second yoke through the first yoke and movable member and from the second yoke through the movable member to the first yoke. Therefore, it is possible to lessen a magnetic flux that takes a shortcut so as to pass from the first yoke through only the magnetic viscous fluid on the upper side and the movable member without being led to the second yoke and then to be led to the first yoke. This enables a magnetic field generated from the coil to efficiently act on the magnetic viscous fluid.

In the manipulation device in the present invention, the width of the movable part slit is preferably smaller than the width of the slit in the first yoke.

According to this, the movable member can capture the spread of the magnetic flux from the first yoke, so the magnetic flux can be led to the second yoke. This enables the magnetic field generated from the coil to more reliably act on the magnetic viscous fluid.

DESCRIPTION OF THE PREFERRED EMBODIMENT

An embodiment of the present invention will be described with reference to the drawings.

First Embodiment

Figure 1:
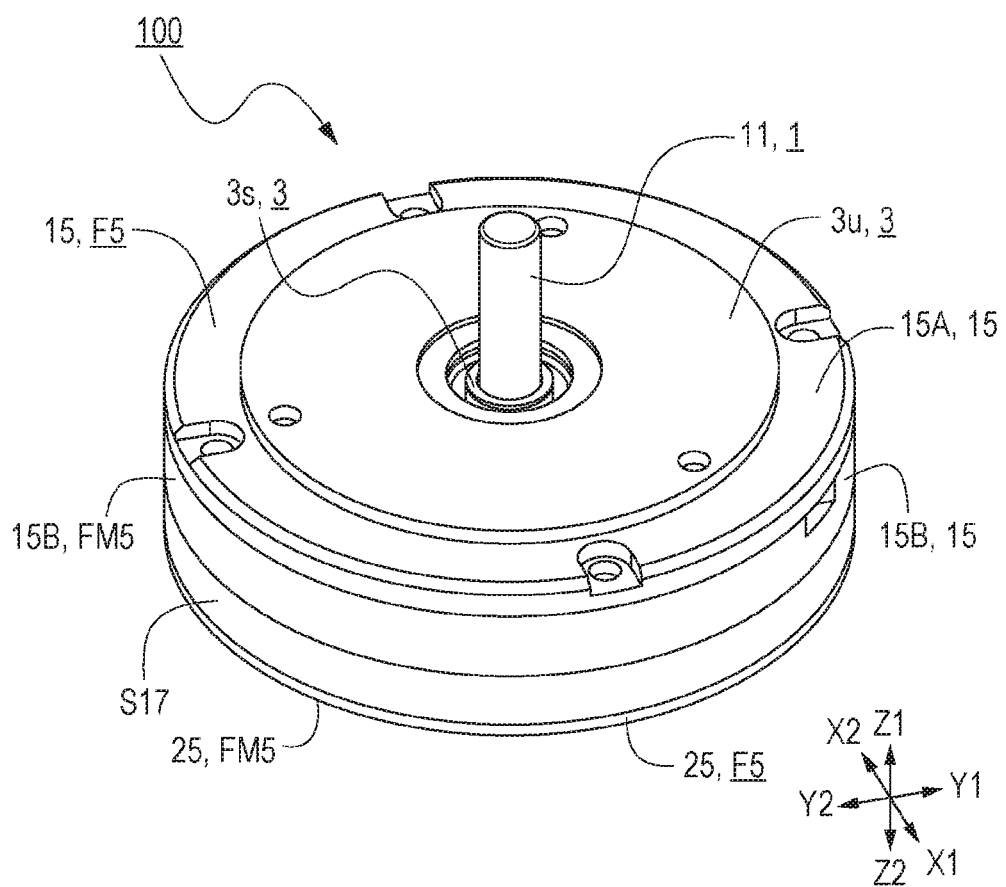
FIG. 1 is a top perspective view of a manipulation device according to a first embodiment of the present invention.
Figure 2:
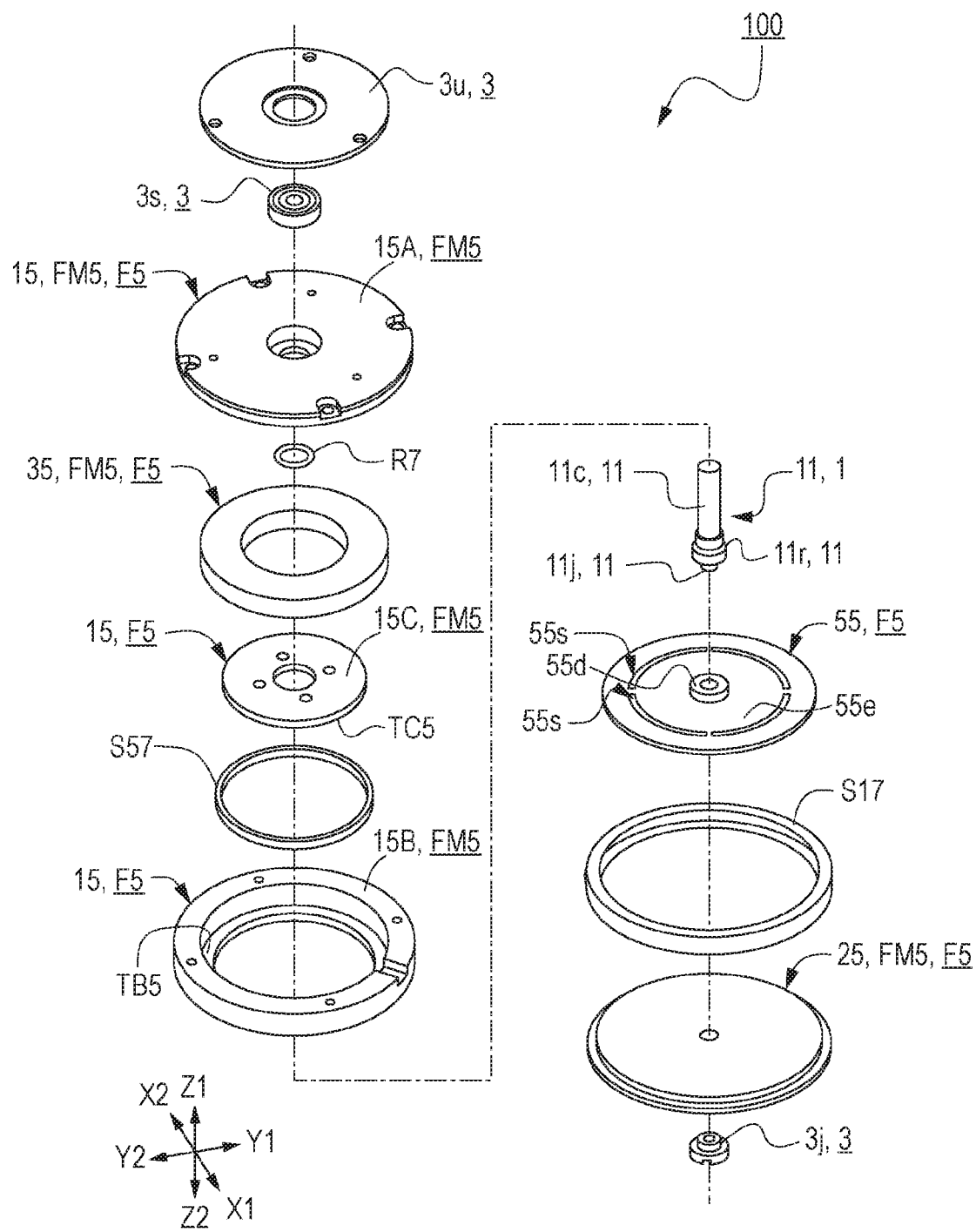
FIG. 2 is an exploded perspective view of the manipulation device according to the first embodiment of the present invention.
Figure 3A:
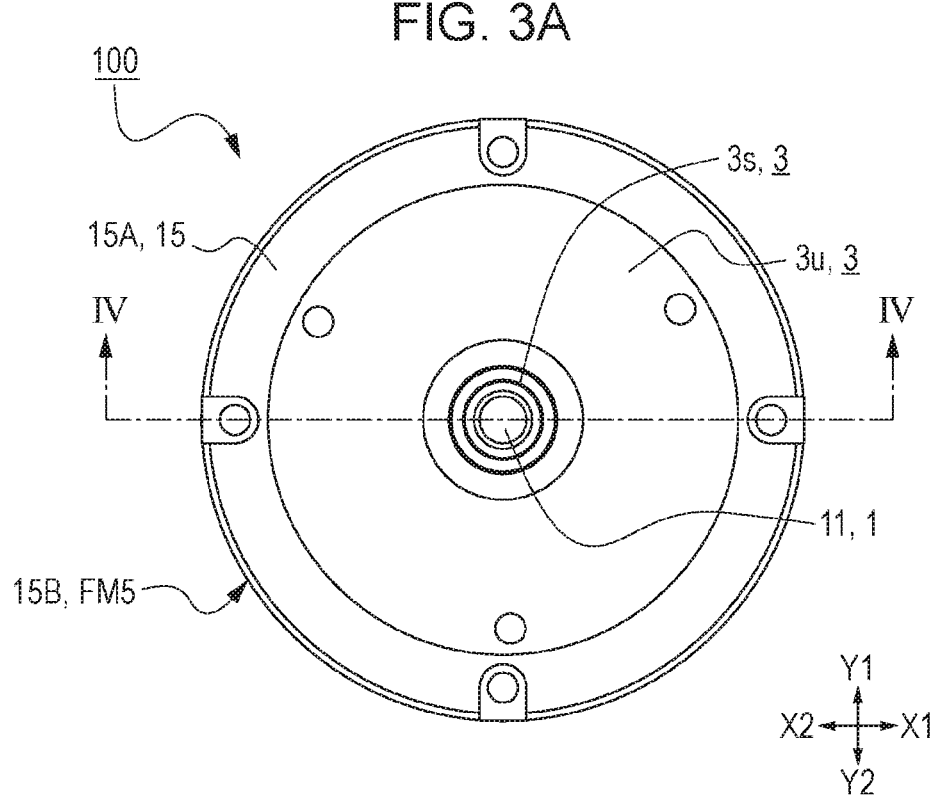
FIG. 3A is a top view of the manipulation device according to the first embodiment of the present invention when viewed from the Z1 side indicated in FIG. 1.
Figure 3B:
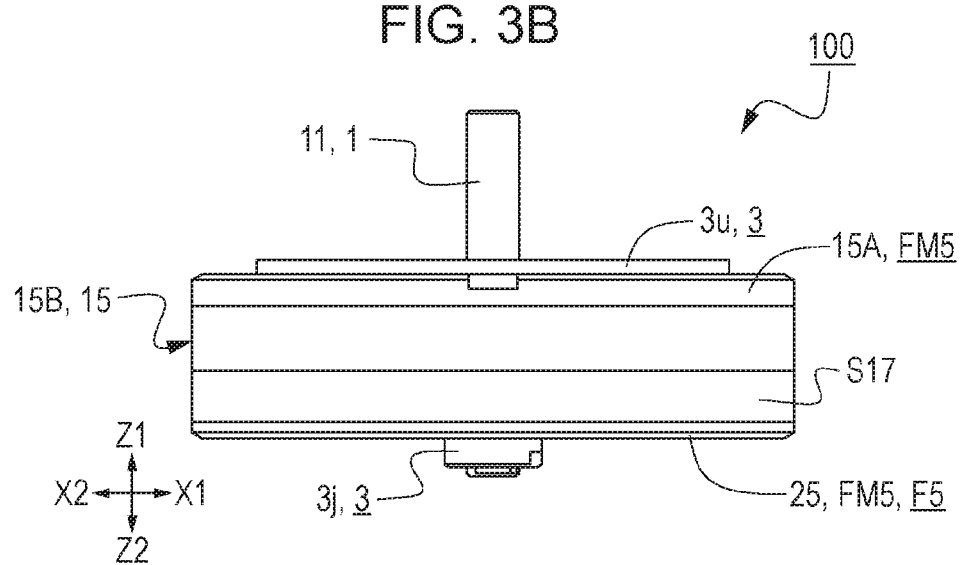
FIG. 3B is a front view of the manipulation device when viewed from the Y2 side indicated in FIG. 1.
Figure 4:
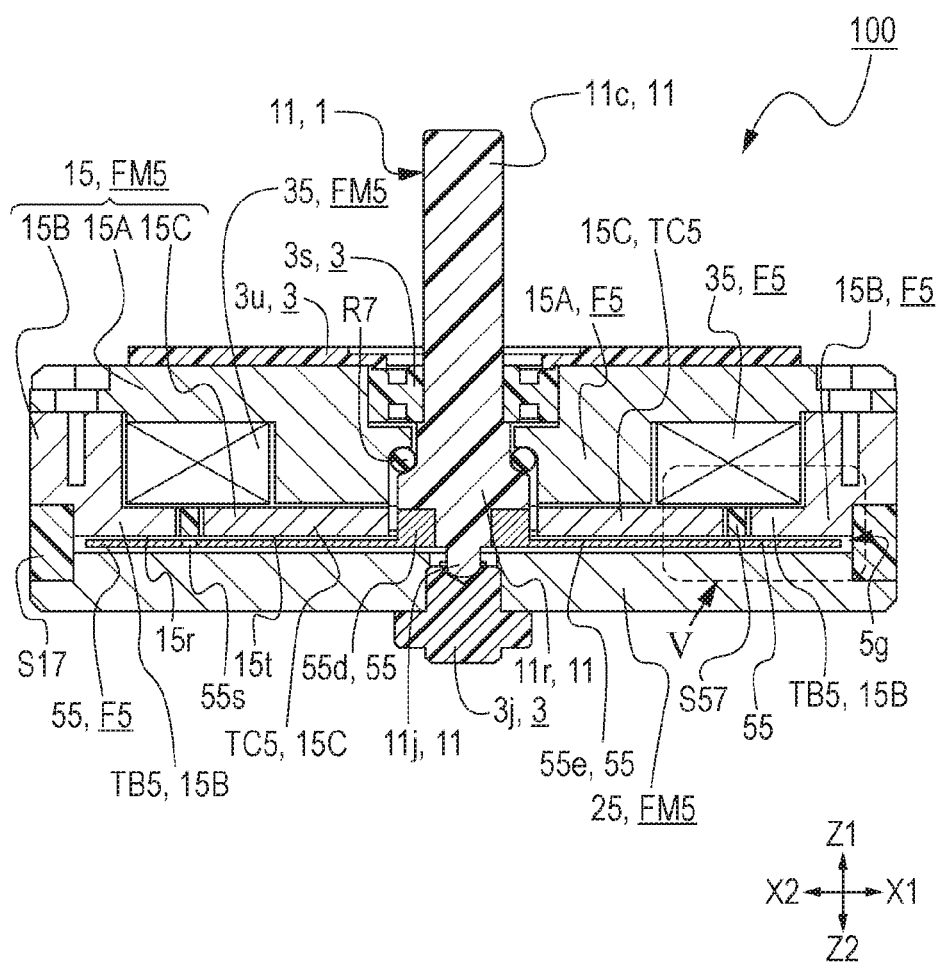
FIG. 4 is a cross-sectional view of the manipulation device in the first embodiment of the present invention, taken along line IV-IV indicated in FIG. 3A.

FIG. 1 is a top perspective view of a manipulation device 100 according to a first embodiment of the present invention. FIG. 2 is an exploded perspective view of the manipulation device 100. FIG. 3A is a top view when viewed from the Z1 side indicated in FIG. 1, and FIG. 3B is a front view when viewed from the Y2 side indicated in FIG. 1. FIG. 4 is a cross-sectional view taken along line IV-IV indicated in FIG. 3A.

The manipulation device 100 in the first embodiment of the present invention has an appearance as illustrated in FIGS. 1 and 3. As illustrated in FIG. 2, the manipulation device 100 is mainly structured by having a manipulation member 1 with a manipulation body 11 that rotationally operates due to a manipulation by the manipulator, a support body 3 that rotatably supports the manipulation body 11, a rotational load imparting mechanism F5 that imparts a rotational load to the manipulation body 11.

In addition to the constituent elements described above, the manipulation device 100 in the first embodiment has a side-wall spacer S17 (see FIG. 2), which forms part of the side wall of the main body, and a slit spacer S57 (see FIG. 4) disposed in the rotational load imparting mechanism F5. With this rotation-type manipulation device 100, the manipulation part (not illustrated), such as a manipulation knob or a manipulation control, of the manipulation member 1 is engaged with one-end of the manipulation body 11. The manipulation part is grasped and manipulated by the manipulator, and the manipulation body 11 rotationally operates in both directions.

If this manipulation device 100 has a rotation detection means (not illustrated) that detects the rotational operation of the manipulation body 11 (for example, the rotational angle of the manipulation body 11), the manipulation device 100 can be used as a rotation type of input device that can input a rotational angle. If a so-called rotation-type variable resistor that is formed with a substrate on which a resistive element pattern is formed and a slider that makes a sliding contact with the resistive element pattern, for example, is used as this rotation detection means, when this rotation-type variable resistor is engaged with the manipulation body 11, the rotational operation of the manipulation body 11 can be easily detected. The rotation detection means is not limited to a rotation-type variable resistor. For example, the rotation detection means may be a magnetic angle detection detecting device that uses a permanent magnet and a magnetism detecting sensor.

First, the manipulation member 1 of the manipulation device 100 will be described. The manipulation member 1 has a manipulation part (not illustrated) that the manipulator grasps, and also has the manipulation body 11 that rotationally operates along with the rotational manipulation of the manipulation part when the manipulation part is engaged.

The manipulation part of the manipulation member 1 is a member, such as a manipulation knob or a manipulation control, that is grasped and manipulated by the manipulator. When the manipulation part is to be used, it is engaged with one end of the manipulation body 11. As the shape of the manipulation part, an easy-to-manipulate shape or the like is considered. The shape of the manipulation part is arbitrarily determined depending on the product to which the manipulation part is applied.

As illustrated in FIG. 2, the manipulation body 11 of the manipulation member 1 has a columnar part 11c having a cylindrical shape, the rotational axis 11j that passes through the center of the columnar part 11c and has a center at the center of rotation, and a ring part 11r provided at another end of the manipulation body 11, the ring part 11r being one size larger than the columnar part 11c. These elements of the manipulation body 11 are manufactured by being injection molded integrally with a synthetic resin such as poly butylene terephthalate (PBT). The manipulation body 11 is structured so as to rotate (swing) around the rotational axis 11j. As illustrated in FIG. 4, an O-ring R7 is placed on the columnar part 11c and is disposed at a linkage portion between the columnar part 11c and the ring part 11r. The O-ring R7 attached to this portion also has a function that closes an accommodation space in which a movable member 55 is accommodated. This prevents a magnetic viscous fluid 75 filled in this accommodation space from leaking from the accommodation space.

Next, the support body 3 of the manipulation device 100 will be described. As illustrated in FIG. 4, the support body 3 mainly includes a bearing part 3j to which an end of the rotational axis 11j of the manipulation body 11 is abutted, an axis supporting part 3s into which the columnar part 11c of the manipulation body 11 is inserted and that guides the columnar part 11c, and a lid part 3u that presses the axis supporting part 3s to stabilize it. The support body 3 supports the manipulation body 11 (part of the manipulation member 1) so that the rotation of the manipulation body 11 becomes free.

The bearing part 3j of the support body 3 has a concave shape on a side facing the rotational axis 11j of the manipulation body 11, as illustrated in FIG. 4. When the manipulation device 100 has been assembled, an end of the rotational axis 11j abuts this concave part of the bearing part 3j and is supported. Then, the bearing part 3j allows the rotational operation of the manipulation body 11 to be easily performed.

The axis supporting part 3s of the support body 3 has a ring shape having a through-hole at the center (see FIG. 2). As illustrated in FIG. 4, the axis supporting part 3s is accommodated in a concave part (see FIG. 6A referenced later) formed in the upper part at the center of the rotational load imparting mechanism F5 (specifically, an upper yoke 15A of a first yoke 15 included in a magnetism generating mechanism FM5 described later). When the cylindrical part 11c of the manipulation body 11 is inserted into the through-hole in the axis supporting part 3s, the axis supporting part 3s rotatably supports the cylindrical part 11c (part of the manipulation body 11).

The lid part 3u of the support body 3 is shaped like a flat plate, the shape being a circular shape having a through-hole at the center (see FIG. 2). The lid part 3u is placed on the rotational load imparting mechanism F5 (specifically, the upper yoke 15A), as illustrated in FIG. 3A. The columnar part 11c of the manipulation body 11 is inserted into the through-hole in the lid part 3u, as is the axis supporting part 3s. The bearing part 3j, axis supporting part 3s, and lid part 3u are manufactured by being injection molded with a synthetic resin such as poly butylene terephthalate (PBT), as is the manipulation body 11.

Figure 5:
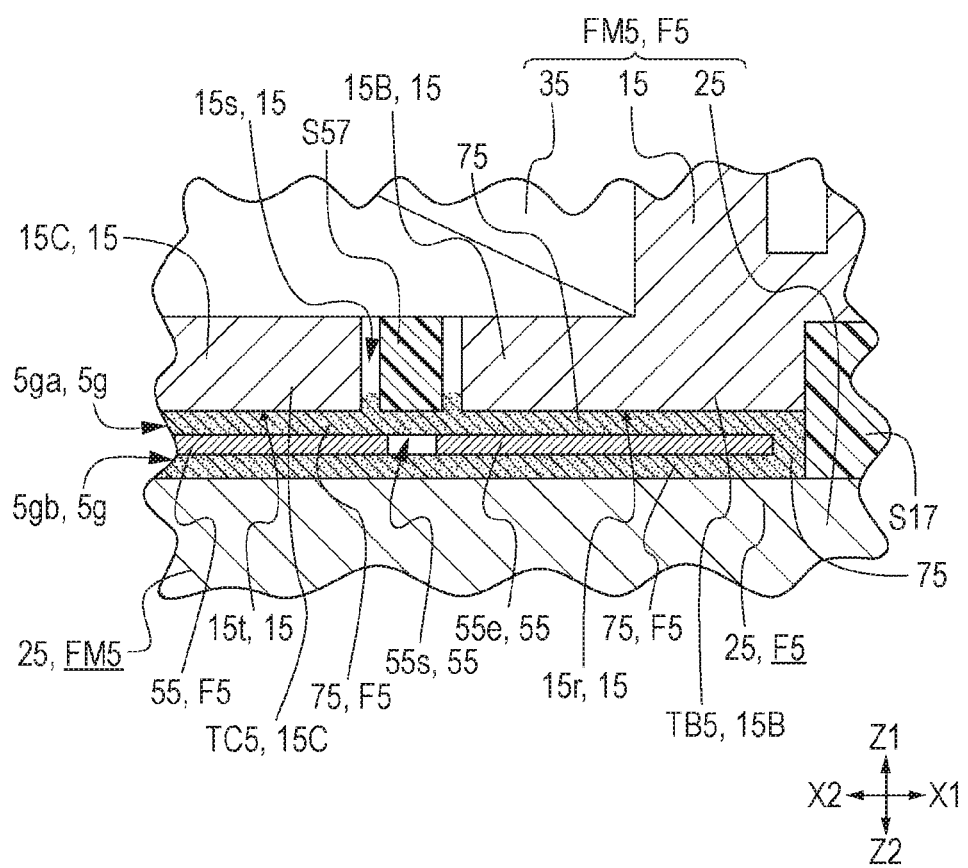
FIG. 5 is an enlarged cross-sectional view, at a portion V indicated in FIG. 4, of a rotational load imparting mechanism in the manipulation device according to the first embodiment of the present invention.
Figure 6A:
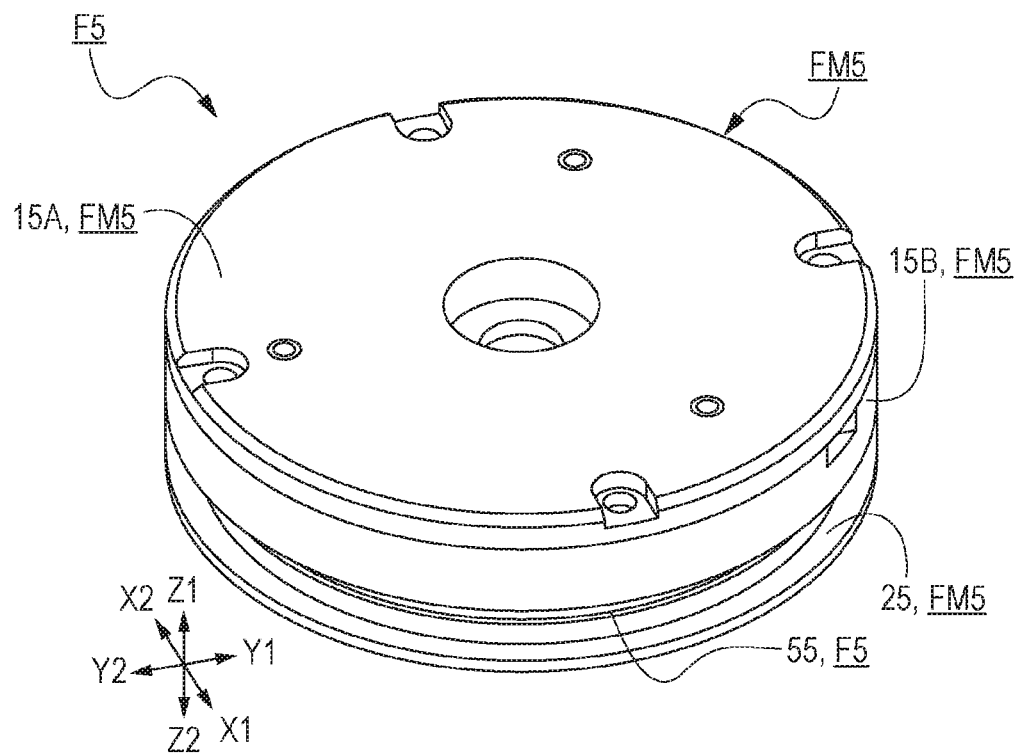
FIG. 6A is a top perspective view of the rotational load imparting mechanism in the manipulation device according to the first embodiment of the present invention.
Figure 6B:
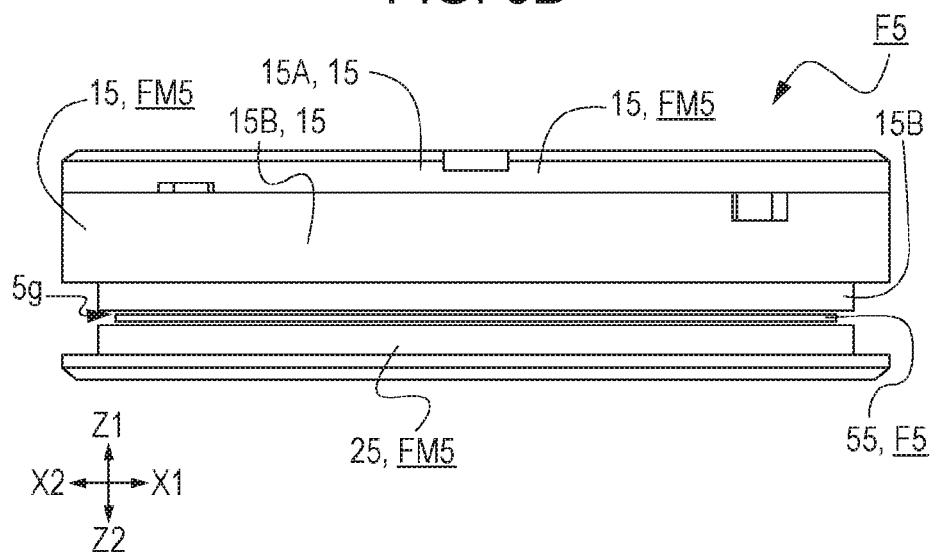
FIG. 6B is a front view of the rotational load imparting mechanism when viewed from the Y2 side indicated in FIG. 6A.
Figure 7A:
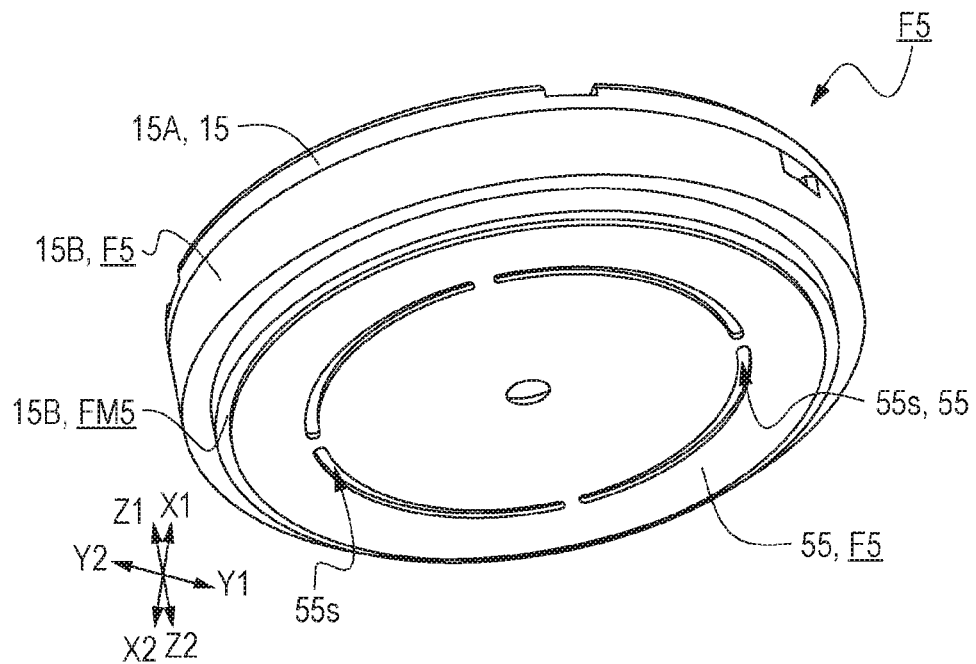
FIG. 7A is a bottom perspective view of the rotational load imparting mechanism in the manipulation device according to the first embodiment of the present invention, the second yoke illustrated in FIGS. 6A and 6B being omitted.
Figure 7B:
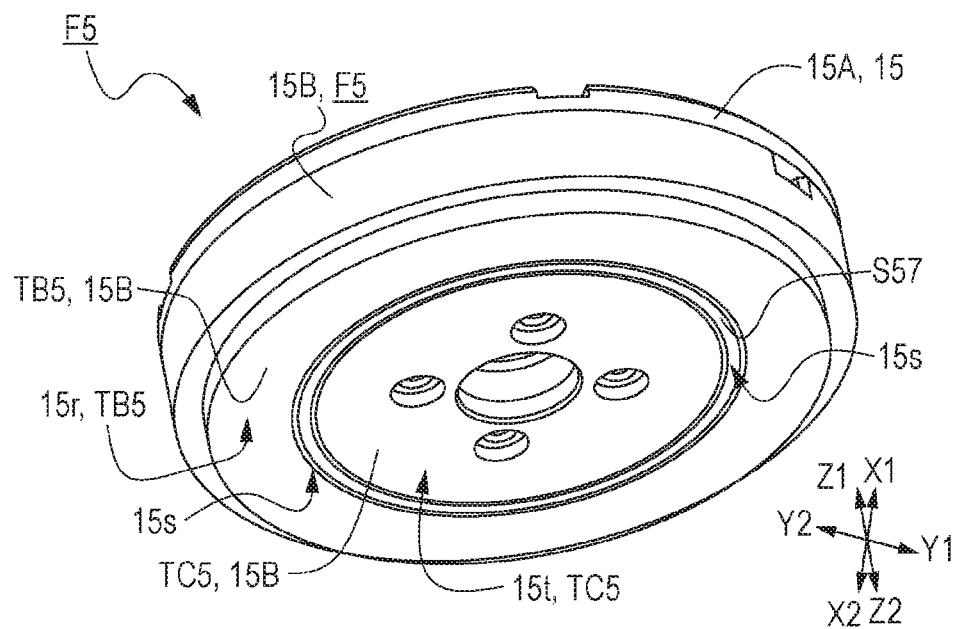
FIG. 7B is also a bottom perspective view of the rotational load imparting mechanism, the movable member illustrated in FIG. 7A being further omitted.

Next, the rotational load imparting mechanism F5 of the manipulation device 100 will be described. FIG. 5 is an enlarged cross-sectional view of a portion V indicated in FIG. 4. FIG. 6A is a top perspective view of the rotational load imparting mechanism F5, and FIG. 6B is a front view when viewed from the Y2 side indicated in FIG. 6A. FIG. 7A is a bottom perspective view in which a second yoke 25 illustrated in FIGS. 6A and 6B is omitted, and FIG. 7B is also a bottom perspective view in which the movable member 55 illustrated in FIG. 7A is further omitted.

The rotational load imparting mechanism F5 includes the movable member 55, which rotationally operates by being engaged with the rotational axis 11j as illustrated in FIG. 4, the magnetism generating mechanism FM5, which faces one side of the movable member 55 with a gap 5g intervening therebetween as illustrated in FIG. 5, and the magnetic viscous fluid 75 present in the gap 5g. The magnetism generating mechanism FM5 in the rotational load imparting mechanism F5 has a cylindrical shape as illustrated in FIG. 6A, and includes a coil 35 that generates a magnetic field by being energized, the first yoke 15 provided so as to enclose the coil 35, the second yoke 25 facing another side of the movable member 55 with the gap 5g intervening therebetween, and a manipulation control part (not illustrated) that controls energization to the coil 35 as illustrated in FIG. 5. The rotational load imparting mechanism F5 is structured so that upon receipt of a rotation manipulation by the manipulator, the rotational load imparting mechanism F5 gives a load from the rotational load imparting mechanism F5 to the manipulation body 11 to impart a rotational load to the manipulation part (such as a manipulation knob or a manipulation control) of the manipulation member 1 for the manipulator.

First, the magnetism generating mechanism FM5 in the rotational load imparting mechanism F5 will be described. The coil 35 in the magnetism generating mechanism FM5 is formed by circularly winding a metal wire. As illustrated in FIG. 4, the coil 35 is disposed on one side (Z1 side indicated in FIG. 4) of the movable member 55. When the coil 35 is energized, a magnetic field is generated around the coil 35. Although the coil 35 has a shape in which a metal wire is wound and its turns are bound, the coil 35 in FIG. 2 has a flattened surface for simplicity.

The first yoke 15 in the magnetism generating mechanism FM5 is disposed so as to enclose the coil 35, as illustrated in FIG. 4. The first yoke 15 preferably includes the upper yoke 15A, which covers one side (Z1 side indicated in FIG. 4) of the coil 35 and the inner side wall (side wall on the center side of the circular shape) of the coil 35, a transverse yoke 15B, which covers the outer side wall of the coil 35 and part of another side (Z2 side indicated in FIG. 4) of the coil 35, a lower yoke 15C, which covers part of the other side of the coil 35. The first yoke 15 is disposed on one side of the movable member 55 as illustrated in FIG. 5. Part of the transverse yoke 15B and the lower yoke 15C face the movable member 55 with the gap 5g (specifically, a first gap 5ga in FIG. 5) intervening therebetween. Due to this first yoke 15, a magnetic flux generated from the coil 35 is confined, so a magnetic field efficiently acts on the movable member 55.

As illustrated in FIGS. 5 and 7B, the first yoke 15 has a slit 15s (yoke slit) defined by the transverse yoke 15B and lower yoke 15C on a side facing the movable member 55, so the first yoke 15 has a divided shape on the side facing the movable member 55. Now, a portion of the transverse yoke 15B, the portion facing the movable member 55, referred to as a first opposing part TB5 of the first yoke 15, and a portion of the lower yoke 15C, the portion facing the movable member 55, is referred to as a second opposing part TC5. As illustrated in FIGS. 4 and 5, the width of this slit 15s is smaller than the width of the gap 5g (specifically, the first gap 5ga) between the first yoke 15 and the movable member 55. Thus, when a magnetic field is generated due to energization to the coil 35, a magnetic path is formed so as to spread toward the movable member 55, for example, from the first opposing part TB5 of the first yoke 15 to its second opposing part TC5.

In the first embodiment of the present invention, the slit spacer S57 in a ring shape (see FIG. 2) is preferably accommodated in the slit 15s in the first yoke 15, as illustrated in FIG. 7B. This slit spacer S57 is preferably formed by using a synthetic resin such as poly butylene terephthalate (PBT). In a magnetic circuit as well, the first opposing part TB5 of first yoke 15 (specifically, the horizontal yoke 15B) and the TC5 of the first yoke 15 (specifically, the lower yoke 15C) are separated from each other by the slit spacer S57. Although in the first embodiment of the present invention, the first yoke 15 is composed of three parts, upper yoke 15A, transverse yoke 15B and lower yoke 15C, this is not a limitation. The first yoke 15 may be composed of two parts or four or more parts.

The second yoke 25 in the magnetism generating mechanism FM5 is formed in a discoid shape as illustrated in FIG. 2. As illustrated in FIGS. 4, 5, and 6B, the second yoke 25 is preferably disposed on the other side of the movable member 55 and faces the movable member 55 with the gap 5g (specifically, a second gap 5gb in FIG. 5) intervening therebetween. Thus, the magnetic flux generated from the coil 35 reliably penetrates from the first opposing part TB5 of the first yoke 15 to the second yoke 25 and from the second yoke 25 to the second opposing part TC5 of the first yoke 15. Therefore, a magnetic path is reliably formed in a direction (Z direction perpendicular to an X-Y plane illustrated in FIG. 6B) perpendicular to a direction (direction crossing an X-Y plane illustrated in FIG. 6A) in which the movable member 55 rotationally operates.

The side-wall spacer S17, which forms part of the side wall of the main body, is formed between the outer periphery of the first yoke 15 (specifically, the transverse yoke 15B) and the outer periphery of the second yoke 25. This side-wall spacer S17 is also formed by using a synthetic resin such as poly butylene terephthalate (PBT). The first yoke 15 (specifically, the transverse yoke 15B) and the second yoke 25 are separated from each other by the side-wall spacer S17 in the magnetic circuit.

The first yoke 15, second yoke 25, and side-wall spacer S17 define a narrow accommodation space in directions (X-Y plane directions) orthogonal to the direction (Z direction illustrated in FIG. 4) along the rotational axis 11j of the manipulation body 11, as illustrated in FIG. 4. The movable member 55 in the rotational load imparting mechanism F5 is disposed in this narrow accommodation space.

The manipulation control part in the magnetism generating mechanism FM5, which uses an integrated circuit (IC), controls the amount of energization to the coil 35, an energization timing, and the like. Specifically, when, for example, the manipulation body 11 is manipulated by the manipulator so as to rotate, upon reception of a detection signal from a position detecting means P6 that detects the manipulation position of the manipulation body 11, the manipulation control part causes a certain amount of current to flow into the coil 35 or changes the amount of current according to the manipulation position of the manipulation body 11.

The manipulation control part is mounted on a circuit board (not illustrated) and is electrically connected to the coil 35. Although the manipulation control part and circuit board are preferably disposed in the vicinity of the magnetism generating mechanism FM5, this is not a limitation. For example, the manipulation control part may be connected to the coil 35 through flexible printed circuits (FPC) or the like and may be mounted on a motherboard in an applicable product.

Next, the movable member 55 in the rotational load imparting mechanism F5 will be described. The movable member 55 is preferably formed from a soft magnetic material such as iron, and is composed of a base part 55d having a through-hole that has a center at the rotational center of the rotational axis 11j and a discoid part 55e in a discoid shape, which is formed integrally with the base part 55d and has a center at the rotational center, as illustrated in FIG. 2.

The base part 55d of the movable member 55 is engaged with the rotational axis 11j of the manipulation body 11 at the lower part of the ring part 11r of the manipulation body 11, as illustrated in FIG. 4. Thus, the discoid part 55e of the movable member 55 rotationally moves in both directions along with the rotational operation of the manipulation body 11 in both directions.

When the manipulation device 100 has been assembled, the discoid part 55e of the movable member 55 is accommodated in the narrow accommodation space described above, as illustrated in FIG. 4. Thus, the magnetic flux generated from the coil 35 reliably penetrates from the first opposing part TB5 of the first yoke 15 to the movable member 55, from the movable member 55 to the second yoke 25, from the second yoke 25 to the movable member 55, and from the movable member 55 to the second opposing part TC5 of the first yoke 15. Accordingly, a magnetic path is reliably formed in a direction perpendicular to the direction in which the movable member 55 rotationally operates.

In the discoid part 55e, movable part slits 55s in an arc shape are formed as illustrated in FIGS. 2 and 7A, the movable part slits 55s resulting from dividing, into four parts, a virtual ring shape that has a center at the rotational center of the rotational axis 11j. Each movable part slit 55s is preferably formed at a position at which the movable part slit 55s faces the slit 15s formed in the first yoke 15, as illustrated in FIGS. 4 and 5. Thus, the magnetic flux generated from the coil 35 is not confined by the movable member 55; the magnetic flux can reliably penetrate to the second yoke 25 through the first yoke 15 and movable member 55 and from the second yoke 25 through the movable member 55 to the first yoke 15. Due to this, it is possible to lessen a magnetic flux that takes a shortcut so as to pass from the first yoke 15 through only the magnetic viscous fluid 75 on the upper side and the movable member 55 without being led to the second yoke 25 and then to be led to the first yoke 15 (from the transverse yoke 15B to the lower yoke 15C without passing through the second yoke 25).

In addition, since the width of the movable part slit 55s is preferably smaller than the width of the slit 15s in the first yoke 15 as illustrated in FIG. 5, the movable member 55 can capture the spread of the magnetic flux from the first yoke 15, so the magnetic flux can be led to the second yoke 25. If a match is made between the center position of the width of the movable part slit 55s and the center position of the slit 15s, it is more preferable.

Figure 8A:
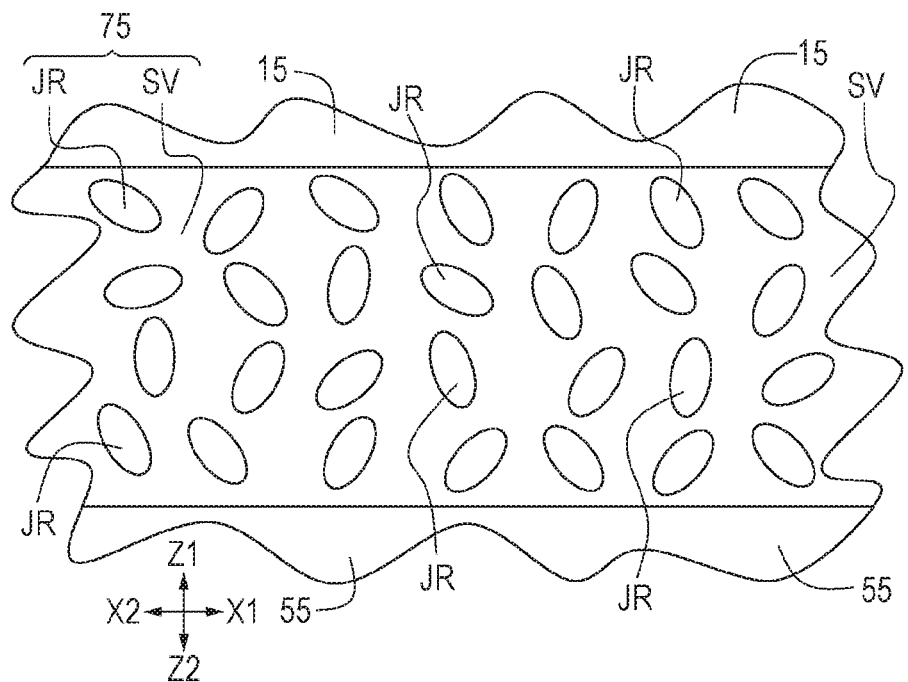
FIG. 8A illustrates a magnetic viscous fluid in the manipulation device according to the first embodiment of the present invention in a state in which a magnetic field is not applied.
Figure 8B:
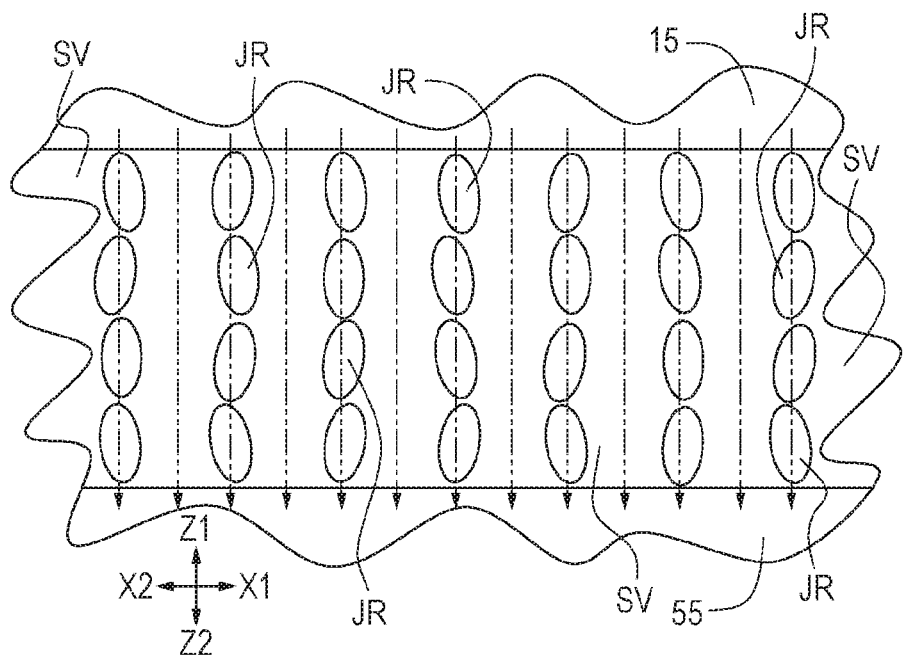
FIG. 8B illustrates the magnetic viscous fluid in a state in which a magnetic field is applied.

Finally, the magnetic viscous fluid 75 in the rotational load imparting mechanism F5 will be described. FIGS. 8A and 8B are each a schematic view illustrating the magnetic viscous fluid 75; FIG. 8A illustrates the magnetic viscous fluid 75 in a state in which a magnetic field is not applied, and FIG. 8B illustrates the magnetic viscous fluid 75 in a state in which a magnetic field is applied. In FIG. 8B, the flow of a magnetic field (magnetic flux) is illustrated by chain double-dashed lines for easy understanding of the explanation.

The magnetic viscous fluid 75 is a substance in which fine magnetic particles JR having magnetism, such as iron or ferrite, are dispersed in a solute SV in which a synthetic resin such as silicone resin is dissolved in, for example, an organic solvent, as illustrated in FIG. 8A. The magnetic viscous fluid 75 is generally called the magneto rheological (MR) fluid. This magnetic viscous fluid 75 has the property that viscosity changes according to the strength of the magnetic field, and is distinguished from a similar magnetic fluid. A major difference in shape between them is the particle diameter of powder. The particle diameter of the MR fluid is about 1 µm to 1 mm. By comparison, the particle diameter of the magnetic fluid is about 10 nm to 1 µm. The particle diameter of the MR fluid is about 100 to 1000 times as large as the particle diameter of the magnetic fluid.

Here, the fact, in this magnetic viscous fluid 75, that viscosity changes according to the strength of the magnetic field will be briefly described. When no magnetic field is applied to the magnetic viscous fluid 75, magnetic particles JR are irregularly dispersed in the solute SV as illustrated in FIG. 8A. In this case, if, for example, the movable member 55 rotationally operates (rotates on a plane (X-Y plane) perpendicular to the Z direction illustrated in FIG. 8A), the movable member 55 rotationally operates easily while receiving a relatively low resistive force.

If a current flows into the coil 35 in the magnetism generating mechanism FM5 and a magnetic field is generated, the magnetic particles JR are regularly arranged in a linearly chained state along the magnetic field acting on the magnetic viscous fluid 75, as illustrated in FIG. 8B (in FIG. 8B, arranged along the Z direction). The degree of this regularity changes according to the strength of the magnetic field. That is, the stronger the magnetic field acting on the magnetic viscous fluid 75 is, the higher the degree of regularity is. A stronger shearing force acts in a direction in which the regularity of the magnetic particles JR arranged in this linearly chained state is lost. As a result, viscosity in this direction is increased. In particular, the highest shearing force acts in a direction orthogonal to the magnetic field that has acted (in FIG. 8B, in an X-Y plane direction).

When the movable member 55 rotationally operates with the coil 35 energized as described above (in the state illustrated in FIG. 8B), a resistive force is exerted on the movable member 55. This resistive force (rotational load) is transmitted to the manipulation body 11 engaged with the movable member 55. Thus, the rotational load imparting mechanism F5 can impart a rotational load in a rotation manipulation to the manipulator. In this case, since the manipulation control part controls the amount of energization to the coil 35, a timing at which to energize, and the like, an arbitrary rotational load can be freely given to the manipulator at an arbitrary timing.

Figure 9:
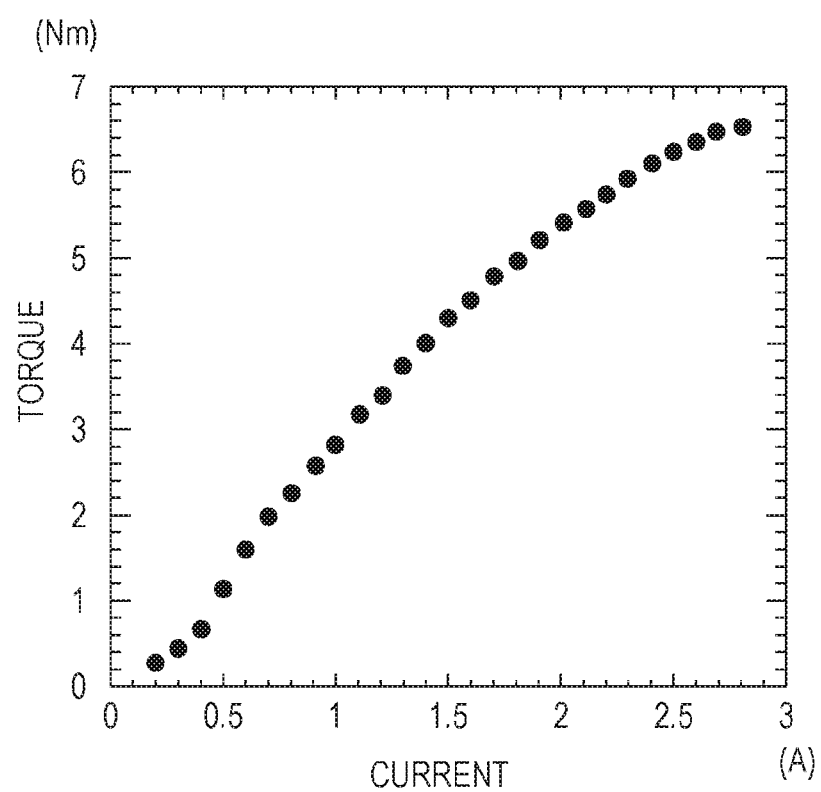
FIG. 9 illustrates the rotational load imparting mechanism in the manipulation device according to the first embodiment of the present invention, the drawing being a graph representing an example of a relationship between a current flowing in a magnetic field generating mechanism and torque applied to a manipulation body.
Figure 10:
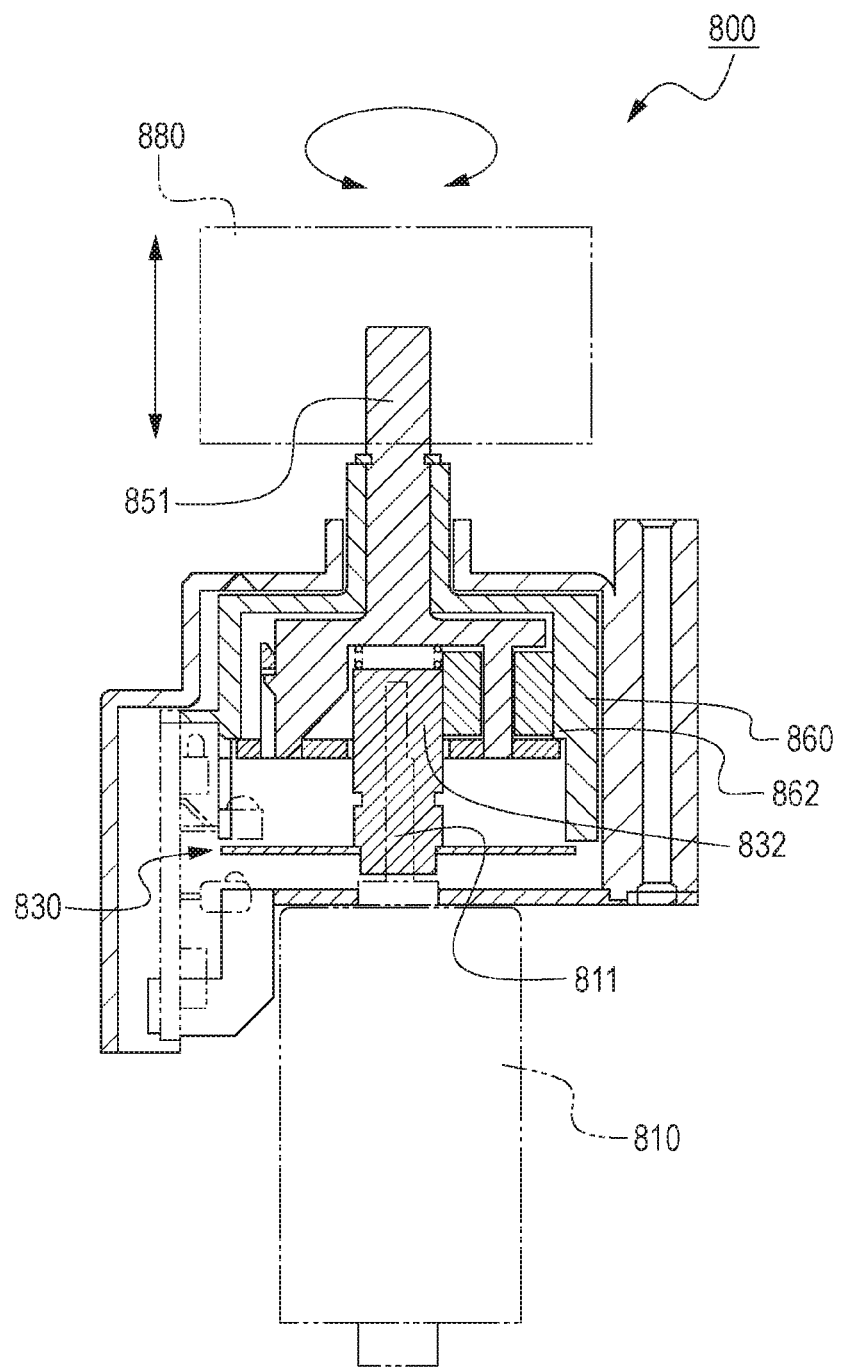
FIG. 10 is a longitudinal cross-sectional view of a manual input device in a first conventional example, illustrating the main elements in the basic structure of the manual input device.
Figure 11:
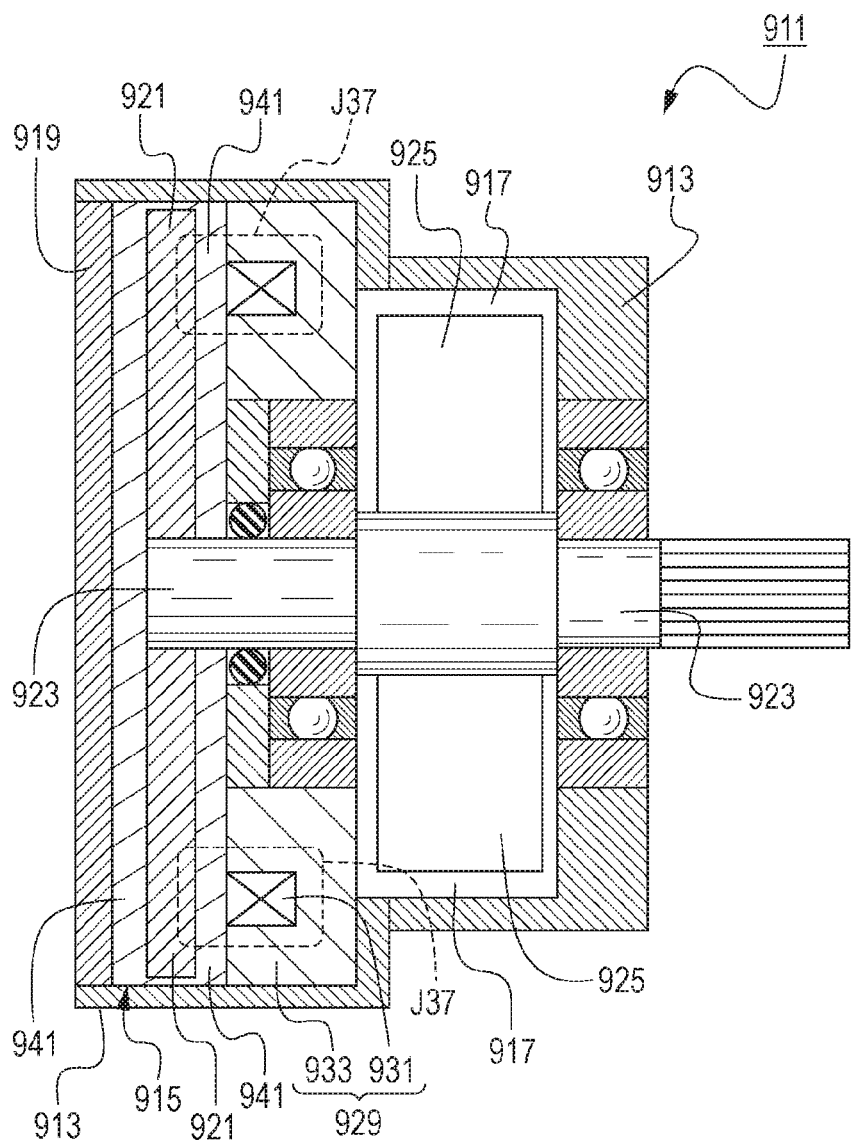
FIG. 11 is a cross-sectional view of a manual brake in a second conventional example in the longitudinal direction.

The result of verifying the fact that the resistive force (rotation load) becomes strong according to the strength of the magnetic field is illustrated in FIG. 9. FIG. 9 is a graph representing an example of a relationship between a current flowing in the coil 35 in the magnetism generating mechanism FM5 and torque applied to the manipulation body 11, with current (A) on the horizontal axis and torque (Nm) on the vertical axis. This torque is equivalent to the resistive force (rotation load) applied to the manipulation body 11.

As illustrated in FIG. 9, when the current that flows into the coil 35 in the magnetism generating mechanism FM5 becomes large, the generated magnetic field is strengthened accordingly. As this magnetic field becomes stronger, torque, that is, the resistive force (rotation load) applied to the manipulation body 11 is increased. On the basis of the fact that according to the strength of the magnetic field, viscosity changes and the resistive force is strengthened in the magnetic viscous fluid 75, as described above, a variable load can be applied to the manipulation body 11 (part of the manipulation member 1).

In the first embodiment of the present invention, the magnetic viscous fluid 75 having the property described above is preferably used. The magnetic viscous fluid 75 is disposed in the gap 5g (specifically, the first gap 5ga in FIG. 5) between the first yoke 15 and the movable member 55, as illustrated in FIG. 4. In particular, as illustrated in FIG. 5, the magnetic viscous fluid 75 is filled in the gap 5g between the movable member 55 and the first opposing part TB5 of the first yoke 15 and between the movable member 55 and the second opposing part TC5 of the first yoke 15. Thus, a rotational load is applied to the movable member 55, which rotationally operates in a direction crossing the magnetic flux formed from the first opposing part TB5 to the movable member 55 and from the movable member 55 to the second opposing part TC5, by the magnetic viscous fluid 75. Due to this, a rotational load is applied to the manipulation body 11 through the movable member 55 and rotational axis 11j. Accordingly, it is possible to provide the manipulation device 100 from which a superior manipulation feeling is obtained.

In addition, in the first embodiment of the present invention, preferably, there is a match between the area of a first opposing plane 15r, illustrated in FIG. 7B, of the first opposing part TB5, the first opposing plane 15r facing the magnetic viscous fluid 75, and the area of a second opposing plane 15t, illustrated in FIG. 7B, of the second opposing part TC5, the second opposing plane 15t facing the magnetic viscous fluid 75. Thus, magnetic flux densities become equivalent at the inlet and outlet of the magnetic flux. This causes the magnetic flux generated from the coil 35 to efficiently act in control of the viscosity of the magnetic viscous fluid 75. Due to this, it is possible to evenly impart a rotational load to the movable member 55 and thereby give a more superior manipulation feeling to the manipulator.

Furthermore, in the first embodiment of the present invention, the magnetic viscous fluid 75 is also preferably filled in the gap 5g (specifically, the second gap 5gb) between the movable member 55 and the second yoke 25. The magnetic flux formed from the first opposing part TB5 of the first yoke 15 through the movable member 55 to the second yoke 25 and from the second yoke 25 through the movable member 55 to the second opposing part TC5 of the first yoke 15 also acts on the magnetic viscous fluid 75 filled this gap 5g (specifically, the second gap 5gb). Therefore, magnetic particles JR can be aligned in a direction perpendicular to the direction in which the movable member 55 rotationally operates, so a stronger rotational load can be applied. Due to this, it is possible to impart a further rotational load, and even in an equivalent magnetic field, give a further large manipulation feeling to the manipulator.

The manipulation device 100, structured as described above, in the first embodiment of the present invention does not use the motor 810 to impart an external force (sense of force) such as a resistance force or thrust that matches the amount of manipulation of the manipulation member 1 and its manipulation direction. This is unlike the first conventional example. Therefore, it is possible to perform downsizing and reduce power consumption. In addition, a sound is not generated when an external force (sense of force) is imparted.

Finally, the effects of the manipulation device 100 in the first embodiment of the present invention will be compiled below.

The manipulation device 100 in the first embodiment of the present invention has been structured so that: the movable member 55, which rotationally operates by being engaged with the rotational axis 11j of the manipulation body 11, is provided; the first yoke 15 is disposed on one side of the movable member 55; the first yoke 15 has the first opposing part TB5 and second opposing part TC5, which are separated by the slit 15s (yoke slit), on a side facing the movable member 55; and the magnetic viscous fluid 75 is filled in the gap 5g (specifically, the first gap 5ga) between the first opposing part TB5 and the movable member 55 and between the second opposing part TC5 and the movable member 55. Thus, a magnetic field is generated by energization to the coil 35, and a magnetic path is formed so as to spread toward the movable member 55 from the first opposing part TB5 of the first yoke 15 to its second opposing part TC5, so magnetic particles JR in the magnetic viscous fluid 75 are aligned along the magnetic flux. Thus, a rotational load is applied to the movable member 55, which rotationally operates in a direction crossing the magnetic flux formed from the first opposing part TB5 to the movable member 55 and from the movable member 55 to the second opposing part TC5, by the magnetic viscous fluid 75. Due to this, a rotational load is applied to the manipulation body 11 through the movable member 55 and rotational axis 11j. Accordingly, it is possible to provide the manipulation device 100 from which a superior manipulation feeling is obtained.

Since, preferably, there is a match between the area of the first opposing plane 15r of the first opposing part TB5 and the area of the second opposing plane 15t of the second opposing part TC5, magnetic flux densities become equivalent at the inlet and outlet of the magnetic flux. This enables the magnetic flux generated from the coil 35 to efficiently act in control of the viscosity of the magnetic viscous fluid 75. Due to this, it is possible to evenly impart a rotational load to the movable member 55 and thereby give a more superior manipulation feeling to the manipulator.

Since the movable member 55 is preferably formed from a soft magnetic material, a magnetic path is reliably formed from the first opposing part TB5 of the first yoke 15 to the movable member 55 and from the movable member 55 to the second opposing part TC5 of the first yoke 15, and thereby magnetic particles JR in the magnetic viscous fluid 75 are aligned in an opposing plane direction (Z direction indicated in FIG. 4) in which the first yoke 15 and movable member 55 face each other. Thus, a stronger rotational load is applied to the movable member 55, which rotationally operates in a direction crossing the opposing plane direction in which the magnetic particles JR are aligned. Due to this, a stronger rotational load is applied to the manipulation body 11 through the movable member 55 and rotational axis 11$j$ and a more superior manipulation feeling can be given to the manipulator.

Since the magnetism generating mechanism FM5 preferably has the second yoke 25 disposed so as to face the other side of the movable member 55, a magnetic path is reliably formed from the first opposing part TB5 of the first yoke 15 to the second yoke 25 and from the second yoke 25 to the second opposing part TC5 of the first yoke 15. Thus, magnetic particles JR can be aligned in a direction perpendicular to the direction in which the movable member 55 rotationally operates, so a stronger rotational load can be applied. Due to this, a stronger rotational load can be applied to the manipulation body 11 through the movable member 55 and rotational axis 11$j$.

Since the magnetic viscous fluid 75 is preferably filled in the gap 5$g$ (specifically, the second gap 5$gb$) between the movable member 55 and the second yoke 25, a further rotational load can be imparted to the movable member 55, which rotationally operates in a direction crossing the magnetic flux. Due to this, even in an equivalent magnetic field, a further large manipulation feeling can be given to the manipulator.

Since the movable member 55 is preferably formed from a soft magnetic material and, in the movable member 55, the movable part slits 55$s$ are preferably formed at positions at which the movable part slits 55$s$ face the slit 15$s$ formed in the first yoke 15, the magnetic flux generated from the coil 35 is not confined by the movable member 55; the magnetic flux can reliably penetrate to the second yoke 25 through the first yoke 15 and movable member 55 and from the second yoke 25 through the movable member 55 to the first yoke 15. Therefore, it is possible to lessen a magnetic flux that takes a shortcut so as to pass from the first yoke 15 through only the magnetic viscous fluid 75 on the upper side and the movable member 55 without being led to the second yoke 25 and then to be led to the first yoke 15 (from the transverse yoke 15B to the lower yoke 15C without passing through the second yoke 25). This enables a magnetic field generated from the coil 35 to efficiently act on the magnetic viscous fluid 75.

Since the width of the movable part slit 55$s$ is preferably smaller than the width of the slit 15$s$ in the first yoke 15, the movable member 55 can capture the spread of the magnetic flux from the first yoke 15, so the magnetic flux can be led to the second yoke 25. This enables the magnetic field generated from the coil 35 to more reliably act on the magnetic viscous fluid 75.

The present invention is not limited to the embodiment described above. The present invention can also be practiced by, for example, making variations as described below. These variations are also included in the technical range of the present invention.

First Variation

Although, in the first embodiment described above, the magnetic viscous fluid 75 has been supplied so as to fill the accommodation space in which the movable member 55 is accommodated (accommodation space defined by the first yoke 15, second yoke 25, and side-wall spacer S17), this is not a limitation; the magnetic viscous fluid 75 only needs to be present in at least part of the gap 5$g$.

Second Variation

Although, in the first embodiment described above, the movable member 55 has been preferably formed from a soft magnetic material, this is not a limitation; the movable member 55 may be formed from a non-magnetic material such as a synthetic resin.

Third Variation

Although, in the first embodiment described above, the movable member 55 has included a discoid shape, this is not a limitation; for example, the movable member 55 may have a rectangular shape or a polygonal shape.

Fourth Variation

Although, in the first embodiment described above, a structure in which the movable part slits 55$s$ are formed in the movable member 55, which is preferably formed from a soft magnetic material, has been taken, a structure in which the movable part slits 55$s$ are not formed may be used. In that case, the movable member 55 is preferably formed from a non-magnetic material.

The present invention is not limited to the above embodiment. The present invention can be appropriately modified without departing from the intended scope of the present invention.

What is claimed is:
1. A rotation-type manipulation device comprising:
a manipulation member including a manipulation body having a rotational axis that allows a rotational operation of the manipulation body according to a manipulation by a manipulator;
a support body that rotatably supports the manipulation body; and
a rotational load mechanism that applies a rotational load to the manipulation body, the rotational load mechanism including:
a movable member in a shape of a round flat plate that rotates by being engaged with the rotational axis of the manipulation member, the movable member having a first main surface and a second main surface opposite to the first main surface;
a magnetism generating mechanism that faces the movable member with a gap provided therebetween, the magnetism generating mechanism including:

a coil that generates a magnetic field by being energized;

a first yoke provided on one side of the movable member so as to enclose the coil, the first yoke having:

a first opposing part facing the first main surface of the movable member across the gap therebetween; and a second opposing part facing the first main surface of the movable member across the gap therebetween, the first opposing part and the second opposing part being separated from each other by a first slit; and a magnetic viscous fluid provided in the gap, the magnetic viscous fluid filling a first portion of the gap between the first opposing part and the movable member and a second portion of the gap between the second opposing part and the movable member, viscosity of the magnetic viscous fluid changing according to strength of the magnetic field, wherein the movable member has a second slit formed therein so as to face the first slit of the first yoke.

2. The manipulation device according to claim 1, wherein an area of the first opposing part facing the magnetic viscous fluid is the same as an area of the second opposing part facing the magnetic viscous fluid.

3. The manipulation device according to claim 1, wherein the movable member is formed of a soft magnetic material.

4. The manipulation device according to claim 1, wherein the magnetism generating mechanism further includes a second yoke disposed on another side of the movable member so as to face the second main surface of the movable member across the gap therebetween.

5. The manipulation device according to claim 4, wherein the magnetic viscous fluid also fills a third portion of the gap between the movable member and the second yoke.

6. The manipulation device according to claim 5, wherein the magnetic field generated by the coil passes though the first opposing part of the first yoke, the first portion of the gap, the movable member, the third portion of the gap, the second yoke, the third portion of the gap, the movable member, the second portion of the gap, and the second opposing part of the first yoke, so as to return to the coil.

7. The manipulation device according to claim 4, wherein:
the movable member is formed of a soft magnetic material.

8. The manipulation device according to claim 1, wherein a width of the second slit in the movable member is smaller than a width of the first slit in the first yoke.

9. The manipulation device according to claim 1, wherein the first yoke is formed so as to cover one side of the coil, an inner side wall and an outer side wall of the coil, and part of another side of the coil.

10. The manipulation device according to claim 1, further comprising a slit spacer formed from a synthetic resin accommodated in the first slit.

11. The manipulation device according to claim 1, wherein the movable member includes a base part engaging with the rotational axis, and a discoid part having the first and second main surfaces and integrally formed with the base part.

12. A rotation-type manipulation device comprising:

a manipulation member including a manipulation body having a rotational axis that allows a rotational operation of the manipulation body according to a manipulation by a manipulator;

a support body that rotatably supports the manipulation body; and a rotational load mechanism that applies a rotational load to the manipulation body, the rotational load mechanism including:

a movable member in a shape of a round flat plate, the movable member having a first main surface and a second main surface opposite to the first main surface, the movable member rotating by engaging with the rotational axis of the manipulation member, the movable member having a circular arc slit formed thereon;

a magnetism generating mechanism that faces the movable member with a gap provided therebetween, the magnetism generating mechanism including:

a coil that generates a magnetic field by being energized;

a first yoke provided on one side of the movable member so as to enclose the coil, the first yoke facing the movable member and having a first opposing part and a second opposing part separated from each other by an annular slit formed therebetween, such that one of the first opposing part and the second opposing part surrounds the other, the first and second opposing parts both facing the first main surface of the movable member with the gap provided therebetween; and a magnetic viscous fluid provided in and filling the gap between the first yoke and the movable member, viscosity of the magnetic viscous fluid changing according to strength of the magnetic field, wherein the annular slit of the first yoke provides a space formed under and along the coil, the space communicating with the gap containing the magnetic viscous fluid, the circular arc slit of the movable member being disposed along the annular slit.

13. The manipulation device according to claim 12,
wherein the magnetism generating mechanism further includes:

a second yoke disposed on another side of the movable member so as to face the second main surface of the movable member across the gap therebetween, and wherein the annular slit of the first yoke and the circular arc slit of the movable member allow the magnetic field generated by the coil to pass through the first opposing part to the movable member to the second yoke, and from the second yoke to the movable member to the second opposing part.

* * * * *